No. 881,781.  
PATENTED MAR. 10, 1908.
A. S. EASTMAN.  
COMBINATION CHURN AND BUTTER WORKER.  
APPLICATION FILED JULY 22, 1907.
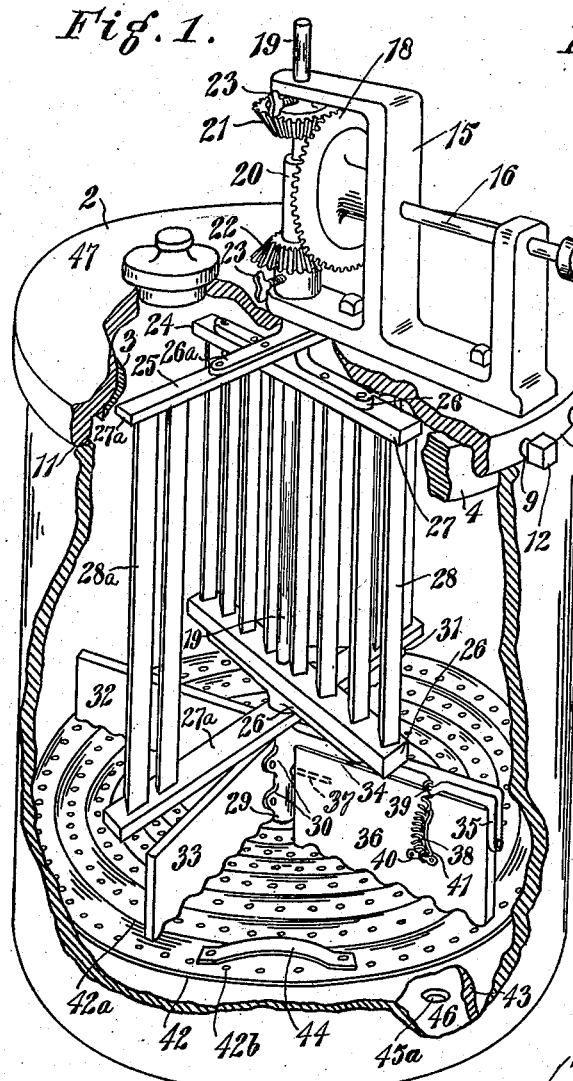
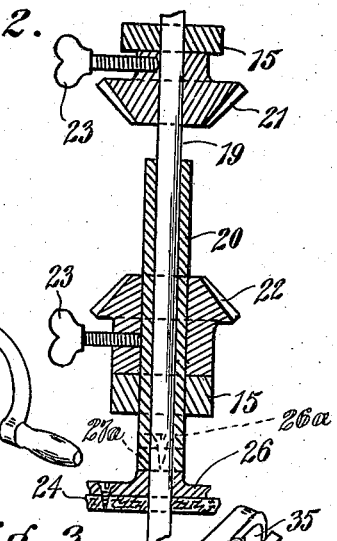
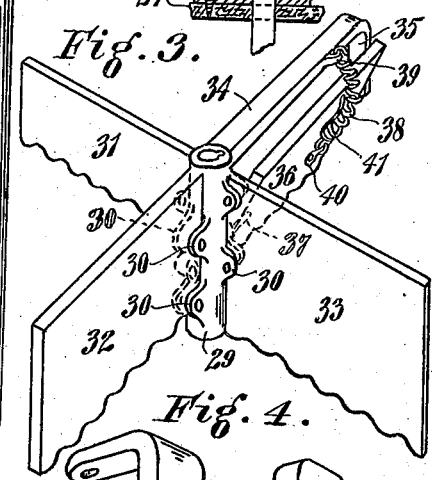
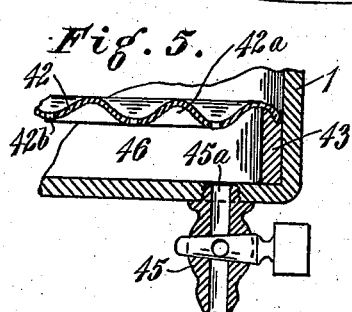
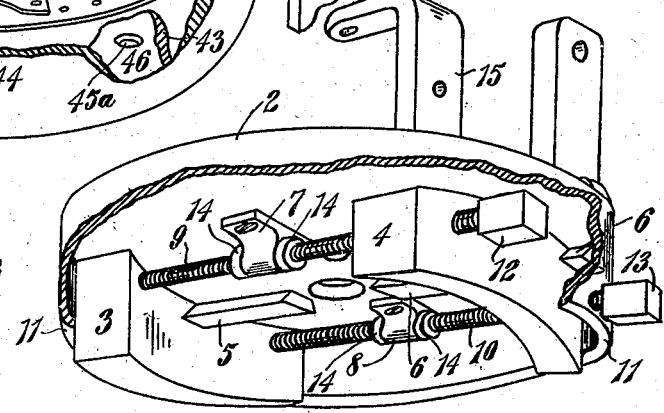
Witnesses:  
Clarence Perdew  
Lucy Werner
Inventor  
Arthur S. Eastman  
By James N. Ramsey  
His Attorney
THE NORRIS PETERS CO., WASHINGTON, D. C.

UNITED STATES PATENT OFFICE.

ARTHUR S. EASTMAN, OF MORROW, OHIO, ASSIGNOR OF ONE-HALF TO GEORGE W. HENGST, OF NORWOOD, OHIO.

COMBINATION CHURN AND BUTTER-WORKER.

No. 881,781.   Specification of Letters Patent.   Patented March 10, 1908.

Application filed July 22, 1907. Serial No. 384,911.

*To all whom it may concern:*

Be it known that I, ARTHUR S. EASTMAN, a citizen of the United States, residing at Morrow, in the county of Warren and State of Ohio, have invented certain new and useful Improvements in a Combination Churn and Butter-Worker, of which the following is a specification.

My invention relates to means for making and preparing butter, the object being to simultaneously churn the milk or cream to produce the butter and to work the butter to remove the butter-milk therefrom, whereby the amount of time and labor is reduced and the quantity of butter produced from a given amount of milk or cream is increased.

My invention consists in a vessel having dashers and butter working paddles rotatably mounted therein, means for rotating the dashers and paddles, a diaphragm adjacent to the paddles to receive the butter to be worked, and in the parts and details of construction and arrangement of parts as will be hereinafter more fully described and claimed.

In the drawings: Figure 1 is a perspective view of my invention, parts being broken away to disclose the inner construction. Fig. 2 is a vertical central section of the concentric shafts, the gears thereon and parts of the dasher connections. Fig. 3 is a perspective view of the butter working paddles, better illustrating the working of the yieldable mounting of one of the paddles. Fig. 4 is a bottom perspective view of the lid, part being broken away to illustrate the fixing apparatus. Fig. 5 is a partial cross section of the diaphragm and lower part of the vessel and spigot.

My improved combination churn and butter worker, as I prefer to embody it, consists in the vessel 1 which may be the ordinary crockery jar provided with a lid 2 which has adjustable fixing mechanism consisting in the movable lugs 3 and 4 preferably mounted on the dovetail guide ways 5 and 6, respectively, on the lower surface of the lid 2. Also rigidly mounted on the lower surface of the lid 2 are the bearings 7 and 8 in which are journaled the screw shafts 9 and 10, respectively, which extend outside the rim 11 of the lid 2, and are preferably provided with the square heads 12 and 13 respectively. The lugs 3 and 4 extend below the lower edge of the rim 11 and this lower edge of the rim 11 is designed to bear upon the upper rim of the vessel 1. The screw shafts 9 and 10 are provided, at either side of their respective journaled bearings 7 and 8, with rigidly mounted collars 14 which prevent the screw shafts from moving longitudinally through the bearings 7 and 8. These screw shafts 9 and 10 extend into and through the lugs 3 and 4 in which lugs are provided female threads corresponding to the male threads on the screw shafts, and the threads of the lug 3 and of the portion of the screw shafts 9 and 10 which extend into said lug 3 are oppositely disposed to the threads in the lug 4 and the threads on the portion of the screw shafts 9 and 10 which extend through said lug 4. Consequently the rotation of the screw shafts 9 and 10 will, by the action of the oppositely disposed threads, cause the lugs 3 and 4 either to approach or recede, depending upon the direction of rotation of the screw shafts 9 and 10. This construction provided upon the lid 2 not only allows it to be adjusted to vessels of different sizes which may be encountered in the use of my improved apparatus, but allows the lid to be fixed on the top of the vessel by the receding of the lugs 3 and 4, so that these lugs are brought into intimate contact with the interior concave surface of the vessel 1 upon which the vessel is used. It is desirable to thus fix the lid on the vessel owing to the fact that the lid forms the support for the dasher and butter working paddle operating mechanism. This operating mechanism consists in the frame 15, having upright members in which are journaled the horizontal shaft 16, provided with a crank 17 for rotating it. A bevel gear 18 is also mounted on this horizontal shaft 16 and the frame 15 is provided with horizontal members in which are journaled the vertical concentric shafts 19 and 20. The shaft 19 runs through the shaft 20 which is hollow.

The bevel gear 21 is mounted on the shaft 19 and the bevel gear 22 is mounted on the shaft 20. Both of these bevel gears 21 and 22 mesh with the bevel gear 18 on the horizontal shaft 16 at diametrically opposite sides thereof, and will therefore receive rotary motion from said bevel gear 18, relatively opposite to each other, when the shaft 16 is turned by means of the crank 17. These bevel gears 21 and 22 are adjustably secured to the vertical shafts 19 and 20, respectively, by means of set screws 23, so that the rotation of the bevel gears 21 and 22 will be transmitted to the vertical shafts 19 and 20 respectively, while at the same time allowing these shafts to be adjusted upwardly or downwardly to accommodate the positions of the dashers 24 and 25, respectively, to the quantity of milk or cream being churned.

The dasher 24, which is rigidly mounted on the shaft 19 by means of the spiders 26, consists in the rails 27, to which the spiders 26 are secured, and in the preferably triangular upright slats 28 having their ends secured in these rails 27. The dasher 25 is similarly constructed and mounted on its shaft 20, being provided with spiders 26$^a$, rails 27$^a$ and slats 28$^a$, except that it is provided with no slats in its middle portion so as to leave a space for the rotation of the dasher 24, which rotates concentrically with it and inside of it. This oppositely disposed concentric rotation of the dashers provided with angular slats is found to be particulary efficient in producing the desired kind and degree of agitation of the milk or cream to quickly extract the butter therefrom as well as to secure the maximum amount of butter from a given quantity of milk or cream.

Below the dashers 24 and 25, mounted upon the lower end of the shaft 19, is a hub 29 provided with lugs 30, in which are rigidly mounted the butter working paddles 31, 32 and 33. This hub is also provided with the radially extending arm 34 which has, preferably, at its outer end the downward extension 35, and a fourth butter working paddle 36 is pivoted in the lower end of this downward extension 35, and on a pin 37 in the hub 29. The butter working paddle 36 is also provided with a spring 38 hooked into the eye 39 on the arm 34 and into a cleat 40 on the paddle 36, while a bridge 41 is secured on the paddle 36 under the spring 38, so that when the paddle 36 swings on its pivotal mountings, the spring 38 will be stretched and tend to return the paddle 36 to its normal vertical position. The pivotal mountings together with the spring above described thus constitute a yieldable mounting for the butter working paddle 36. Below the butter working paddles is the diaphragm 42, which is supported by a ring 43 resting on the bottom of the vessel 1, thus leaving a space between the diaphragm 42 and the bottom of the vessel 1. A trip 44 is rigidly secured on the diaphragm 42 in the path of rotation of the butter working paddle 36 and extending to a sufficient height to retard the lower edge of said butter working paddle 36 and cause it to swing out of its normal position against the tension of the spring 38, and the other paddles 31, 32 and 33 are so proportioned and mounted on the hub 39 that their lower edges are variously spaced from the diaphragm 42, the amount of this space increasing with each successive paddle. It is desirable to have the paddle 36 extend closely adjacent to the diaphragm 42. The diaphragm 42 is corrugated concentrically and each of these corrugations 42$^a$ is provided in its bottom with a series of perforations 42$^b$. The lower edge of the butter working paddles are serrated and their serrations coincide with the corrugations of the diaphragm 42. The above described corrugations and the corresponding serrations thus increase the amount and irregularity of the surfaces with which the butter may be brought in contact to be worked, while the various positions of the lower edges of the paddles allow these paddles to act with progressively increasing force upon the butter when the shaft 19 is rotated. Thus the edge of the paddle 31 which is farthest separated from the diaphragm 42 will first act upon the mass of butter which has been extracted and precipitated by the action of the dashers 24 and 25. Then the paddle 32, the lower edge of which is somewhat lower than that of the paddle 31, will further act on the butter to be followed by the paddle 33, the lower edge of which is lower than that of the paddle 32. It will thus be seen that the mass of butter is being worked as fast as it is precipitated from the milk or cream, and after the operation of the paddle 33 this mass of butter will be stretched out over the diaphragm 42, having reached this condition by gradual stages through the above described operation of the paddles.

The paddle 36, which extends closely adjacent to the diaphragm 42, will next come into contact with the flattened mass of butter, and being held in normal vertical position by this yieldable mounting, will act upon the mass of butter to restore it to the shape initially occupied. Then when the dasher 36 makes contact with the trip 44 the yieldable mounting will be overcome and will allow the paddle 36 to release the mass of butter and leave it in position for the recurring contact of the paddle 31. Thus the operation of successively flattening and re-shaping the mass of butter occurs at each revolution of the shaft 19. This continuous agitation due to the progressive action of the paddles as well as to the thoroughness of contact produced between the mass of butter and the corrugations and serrations of the diaphragm and paddles, respectively, constitute what is found in practice to be a most efficient means of working the butter into the desired marketable condition. While the butter is thus being worked immediately after its extraction by the dashers, it should be noted that the completion of the working occurs after the greatest possible amount of butter has been extracted from the milk or cream and the residue of butter-milk has been drawn off from the vessel. For this purpose a spigot 45 is provided in an outlet opening in the bottom of the vessel. During the final working to complete the process the buttermilk removed from the butter flows through the perforations 42$^b$ in the bottoms of the corrugations 42$^a$ of the diaphragm 42 into the space 46 in the bottom of the vessel, from which it is likewise drawn off through the spigot 45. A suitable inspection opening is provided in the lid 2 and closed by the removable plug 47.

From the above, it will be seen that owing to the improved construction and operation of the dashers, as described, rapidity and thoroughness of extraction of the butter from the milk or cream is increased, while from the improved construction and operation of the butter working paddles as described, the rapidity and thoroughness of the working of the butter produced is increased. By the simultaneous operation of the dashers and butter working paddles a further saving of time and increased thoroughness of operation is effected, inasmuch as the major part of the working of the butter will have been completed when the extraction of all the butter from the milk or cream has been effected, making only a short operation necessary to complete the working of the butter after the main body of buttermilk has been drawn off.

Having thus fully described my invention, what I claim as new and desire to secure by Letters Patent is:

1. In a combination churn and butter worker, a vessel, a rotatable dasher mounted therein, and a series of butter working paddles adapted to rotate simultaneously with said dasher, substantially as and for the purposes herein specified.

2. In a combination churn and butter worker, a vessel, a shaft journaled vertically therein, a dasher mounted on said shaft, a diaphragm below said dasher adapted to receive the butter formed by the operation of said dasher, and a series of butter working paddles adjacent to said diaphragm and adapted to rotate simultaneously with said dasher and said shaft, substantially as and for the purposes herein specified.

3. In a combination churn and butter worker, a vessel, a shaft journaled vertically therein, a dasher mounted upon said shaft, a diaphragm mounted in said vessel and spaced apart from the bottom of said vessel, and a series of butter working paddles adjacent to said diaphragm and adapted to rotate simultaneously with said dasher, substantially as and for the purposes herein specified.

4. In a combination churn and butter worker, a vessel, a dasher rotatably mounted therein, a series of butter working paddles mounted therein below said dasher, and adapted to rotate simultaneously therewith, a diaphragm mounted in said vessel below said butter working paddles, a trip mounted on said diaphragm adapted to be engaged by one of said paddles, the other paddles of said series being variously spaced from said diaphragm and a yieldable mounting for the paddle by which said trip is adapted to be engaged, substantially as and for the purposes herein specified.

5. In a combination churn and butter worker, a vessel, a dasher rotatably mounted therein, butter working paddles rotatably mounted therein, a lid, operating mechanism for said dasher and said paddles mounted upon said lid, and adjustable lugs on said lid adapted to engage with the concave surface of said vessel to fix the position of said dasher and paddles and the operating mechanism therefor, substantially as and for the purposes herein specified.

6. In a combination churn and butter worker, a vessel, a lid, means for fixing the position of said lid on said vessel, a frame mounted on said lid, a hollow shaft journaled in said frame, a dasher mounted on said hollow shaft to rotate therewith, a second shaft journaled in said frame and passing through said hollow shaft concentric therewith, a second dasher mounted upon said second shaft to rotate therewith, gears adapted to rotate said shafts in opposite directions relative to each other, a series of butter working paddles mounted on said second shaft below said dashers and a diaphragm mounted in said vessel below said butter working paddles, substantially as and for the purposes herein specified.

7. In a combination churn and butter worker, a vessel, a lid on said vessel, means for fixing the position of said lid, a dasher mounted within said vessel and supported by said lid, operating mechanism for said dasher mounted on said lid, butter working paddles mounted within said vessel, operative connection between said butter working paddles and said operating mechanism for said dasher, and a diaphragm mounted within said vessel below said butter working paddles, substantially as and for the purposes herein specified.

8. In a combination churn and butter worker, a vessel, a lid on said vessel, means for fixing the position of said lid, a frame mounted upon said lid, a shaft journaled horizontally in said frame, means for rotating said shaft, a gear wheel mounted upon said shaft, shafts mounted vertically in said frame concentric to each other, gears adjustably mounted upon said vertically mounted shafts and in mesh with said gear on said horizontal shaft whereby said vertically mounted shafts are adapted to rotate in opposite directions relative to each other, dashers mounted upon said vertically mounted shafts within said vessel, a series of butter working paddles mounted on one of said vertically mounted shafts below said dashers, a diaphragm mounted within said vessel below said butter working paddles, a trip on said diaphragm adapted to be engaged by one of said paddles, the other paddles of said series being variously spaced from said diaphragm, and a yieldable mounting for the paddle by which said trip is adapted to be engaged, substantially as and for the purposes herein specified.

9. In a combination churn and butter worker, a vessel, a lid, a dasher and butter working paddles in said vessel, a diaphragm in said vessel adjacent to said butter working paddles, operative mechanism for said dasher and said butter working paddles mounted upon said lid, a lug mounted on said lid, a second lug mounted on said lid, and movable with respect to said first mentioned lug, a screw shaft journaled on said lid, and oppositely disposed threads on said screw shaft in engagement with said lugs, respectively, whereby said lugs may be caused to engage with the concave surface of said vessel to fix the position of said lid and said operating mechanism thereon, substantially as and for the purposes herein specified.

10. In a combination churn and butter worker, a vessel, a dasher in said vessel, butter working paddles in said vessel, operative mechanism for said dasher and said butter working paddles whereby they will be rotated, and a concentrically corrugated diaphragm below said butter working paddles, substantially as and for the purposes herein specified.

11. In a combination churn and butter worker, a vessel, a dasher in said vessel, butter working paddles in said vessel, operative mechanism for said dasher and said butter working paddles whereby they may be rotated, and a perforated concentrically corrugated diaphragm mounted in said vessel below said butter working paddles and spaced apart from the bottom of said vessel, the perforations in said diaphragm being in the bottoms of said corrugations, substantially as and for the purposes herein specified.

12. In a combination churn and butter worker, a vessel, a dasher in said vessel, butter working paddles in said vessel, operative mechanism for said dasher and said butter working paddles whereby they may be rotated, and a perforated diaphragm mounted in said vessel below said butter working paddles and spaced apart from the bottom of said vessel, substantially as and for the purposes herein specified.

13. In a combination churn and butter worker, a vessel, a dasher in said vessel, operative mechanism for said dasher whereby it may be rotated, a series of butter working paddles in said vessel in operative connection with the operative mechanism for said dasher whereby they may be rotated, serrations on the lower edges of said butter working paddles, a concentrically corrugated diaphragm in said vessel adjacent to said butter working paddles with the serrations of which its corrugations coincide, a trip mounted on said diaphragm and adapted to be engaged by one of said butter working paddles which extends closely adjacent to said diaphragm, the other paddles in said series being variously spaced from said diaphragm, and a yieldable mounting for the paddle by which said trip is adapted to be engaged, substantially as and for the purposes herein specified.

14. In a combination churn and butter worker, a vessel, a dasher in said vessel, operative mechanism for said dasher by means of which it may be rotated, a series of butter working paddles in said vessel, operative connection between said butter working paddles and said operative mechanism whereby they may be rotated, serrations on the lower edges of said butter working paddles, a perforated concentrically corrugated diaphragm below said butter working paddles with the serrations of which its corrugations coincide, the perforations being in the bottoms of said corrugations, and said diaphragm being spaced away from the bottom of said vessel, a trip mounted on said diaphragm and adapted to be engaged by one of said butter working paddles which extends closely adjacent to said diaphragm, the other paddles of said series being variously spaced from said diaphragm, and a yieldable mounting for the paddle by which said trip is adapted to be engaged, substantially as and for the purposes herein specified.

15. In a combination churn and butter worker, a vessel, a lid on said vessel, a frame on said lid, a shaft horizontally mounted in said frame, means for rotating said shaft, a gear mounted on said shaft, shafts vertically mounted in said frame concentric to each other, gears adjustably mounted on said shafts and in mesh with said gear on said horizontally mounted shaft, whereby said shafts may be rotated in opposite directions relative to each other, dashers rigidly mounted on said shafts within said vessel, a series of butter working paddles mounted on one of said shafts whereby they are adapted to be rotated simultaneously with said dashers, serrations on the lower edges of said butter working paddles, a perforated concentrically corrugated diaphragm below said butter working paddles with the serrations of which its corrugations coincide, the perforations being in the bottoms of said corrugations and said diaphragm being spaced away from the bottom of said vessel, a trip mounted on said diaphragm adapted to be engaged by one of said butter working paddles, which extends closely to said diaphragm, the other paddles of the series being variously spaced from said diaphragm, and a yieldable mounting for the paddle by which said trip is adapted to be engaged, substantially as and for the purposes herein specified.

16. In a combination churn and butter worker, a vessel, a dasher in said vessel, butter working paddles in said vessel, a diaphragm in said vessel below said butter working paddles, operative mechanism for said dasher and said butter working paddles and an adjustable operative connection between said operative mechanism and said dasher and said butter working paddles, substantially as and for the purposes herein specified.

ARTHUR S. EASTMAN.

Witnesses:
   JAMES N. RAMSEY,
   CLARENCE PERDEW.